Sept. 6, 1966   A. R. BREMER   3,270,884
DUAL VALVE, DUAL ELEMENT FLUID FILTER ASSEMBLY
Filed June 27, 1963   2 Sheets-Sheet 1

INVENTOR.
ALLEN R. BREMER
BY L.E. Carnahan
AGENT

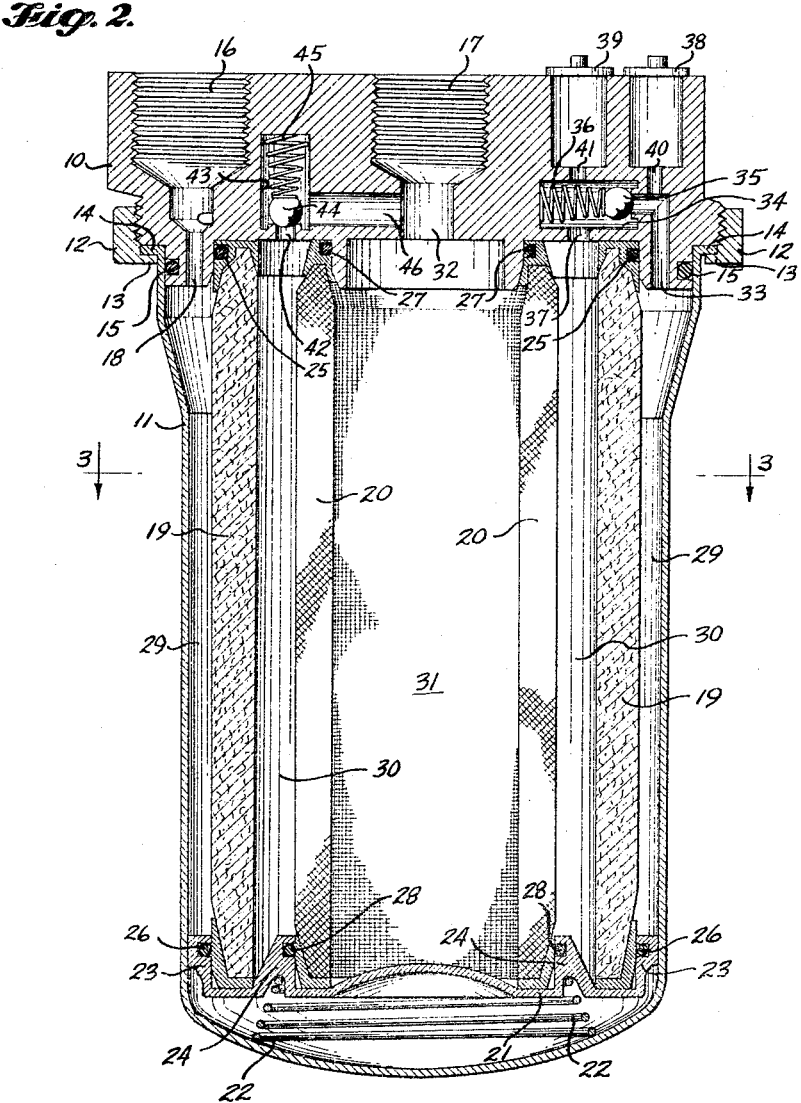

United States Patent Office 3,270,884
Patented Sept. 6, 1966

3,270,884
DUAL VALVE, DUAL ELEMENT FLUID
FILTER ASSEMBLY
Allen R. Bremer, Seattle, Wash., assignor to The Boeing Company, Seattle, Wash., a corporation of Delaware
Filed June 27, 1963, Ser. No. 291,063
4 Claims. (Cl. 210—90)

This invention relates to a fluid filter system, and more particularly to a plural stage filter system for the hydraulic system of an aircraft arranged in a manner to cause gradual and complete clean-up of the oil therein with by-pass valves to accommodate pressure and/or flow surges and indicators to warn the operator that servicing is needed.

Maintenance of clean hydraulic fluid requires efficient filtration. Wear and abrasion of parts result in the production of very fine particles which have a tendency for sedimentation in regions where the fluid flow rate is low, and for collection in clearances in the system components such as valves, actuators and pumps which collection in the course of time will cause high wear rates and failure of these components.

It is difficult to provide a filter element capable of removing very small particles, usually less than 5 microns in size, which has a sufficient flow capacity to meet the flow requirements of the typical aircraft system. In normal flight of a typical commercial transport aircraft, e.g. a Boeing 720, a flow of hydraulic fluid in the order of 5 gallons per minute or less is encountered, but when surges occur such as caused by operation of the landing gear, for example, a flow rate of approximately 44 g.p.m. is required.

The known filter systems prior to this invention were unable to handle the flow rates within this type system and still provide efficient filtration due to the limited space and weight requirements of an aircraft since the flow capacity of a filter is a function of surface area and micron removal ratings.

The instant invention is directed to a fluid filtering system which functions to eliminate the present need for hydraulic system flushing after pump or other system component failures, thus substantially reducing the maintenance man-hours and aircraft-out-of-service time, while continuing to function to collect very fine particles, thus maintaining the fluid clean at all times.

In accordance with this invention, a fluid filter system is provided that is capable of removing a substantial portion of very fine particles while being capable of supplying the required high flow rates. The system incorporates mechanism responsive to the fluid flow within the filter assembly for by-passing portions or all of the filtering elements thereby preventing excessive fluid pressure flow through the filter elements and lines leading to such assembly, and in addition provides mechanism for indicating that the assembly is in need of servicing.

Therefore, an object of this invention is to provide a two-stage fluid filter system having very fine particle entrapment capability without substantial limitation of fluid flow-rate therethrough.

A still further object of the invention is to provide a fluid filter system wherein the fluid normally flows through a fine filter element and then through a relatively coarse filter element during relatively low flow rates with fluid flow responsive means for at least partially by-passing the fine filter element during higher system flow rates.

Another object of the invention is to provide a fluid filter system utilizing at least one fine filter element, at least one coarse filter element, by-pass means for each filter element, and means for indicating clogging of each of the filter elements.

Another object of the invention is to provide a filtering system incorporating a plurality of filter elements and wherein at least one of the filter elements is held in reserve in a sense due to the larger micron rating of that filter element with respect to the micron rating of the element that normally first receives the fluid to be filtered.

Other objects of the invention not specifically set forth above will become readily apparent from the following description and drawings in which:

FIG. 2 is a longitudinal section through a filter assembly in accordance with the invention;

The system shown includes a filter assembly which comprises two concentric filters arranged to receive fluid in serial flow. The primary filter is equipped with a by-pass valve and clogged filter indicator which is actuated by an increased pressure drop across the primary filter. A secondary filter has a by-pass valve and a clogged filter indicator which is actuated likewise by an increased pressure drop across the secondary filter. The filter assembly is located on the return side of the hydraulic system. During normal low flow rates the fluid passes through both filters. When fluid flow above a predetermined amount is encountered, the by-pass valve for the primary filter is actuated to direct a portion of the fluid around the primary filter to the secondary filter. When contamination in the primary filter increases to a given point, the fluid pressure differential across the filter actuates the clogged filter indicator for that filter. As the primary filter is further contaiminated fluid flow therethrough becomes restricted thus causing an increase in pressure on the inlet side of the filter assembly which actuates the by-pass valve and permits the fluid to flow around the primary filter to the secondary filter. In like fashion, the clogged filter indicator of the secondary filter is actuated as soon as contamination of that filter reaches a certain point due to the predetermined pressure differential thereacross. As contamination of the secondary filter increases, the by-pass valve therefor is actuated to relieve the filter assembly of the increased pressure caused by the restricted fluid flow due to the clogged secondary filter. Thus actuation of both indicators warns the operator of the system that the filters are clogged and need servicing.

Under normal servicing of the filtering system, the secondary filter should not become contaminated to the extent that the by-pass valve therefor would open. However such a by-pass valve is essential to provide structural protection for the system components and return lines in case of some abnormal condition causing secondary filter clogging.

Figure 1:
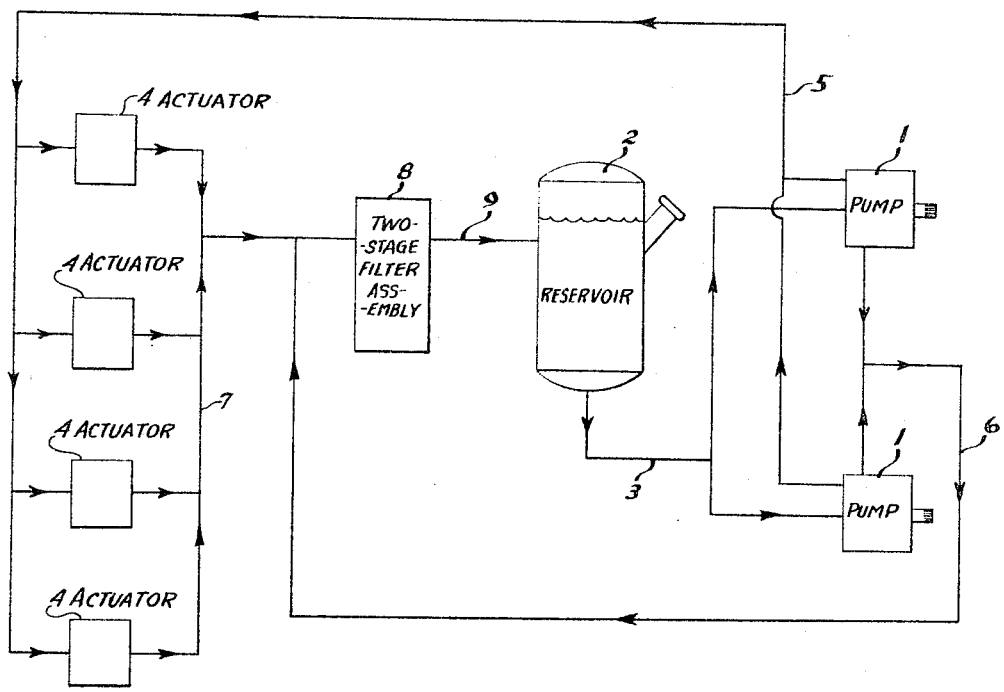
FIG. 1 shows a fluid system incorporating the invention.

Referring now to FIG. 1, the system includes a pair of fluid pumps 1 connected on the inlet side thereof to fluid reservoir 2 through conduit means 3 and supplying pressure fluid to a plurality of fluid actuators 4 through conduit means 5, said pumps 1 being provided with casing drain conduit means 6 which interconnects with a return conduit means 7 between actuators 4 and a two-stage filter assembly 8, said filter assembly connected with reservoir 2 through conduit means 9. Fluid actuators 4 may be used for any desired use such as actuating mechanism for wing flaps, landing gear, etc., of an aircraft. While not shown, the FIG. 1 system in actual practice would incorporate means for controlling pumps 1 and/or valve mechanism for controlling the pressure fluid to actuators 4.

Figure 3:
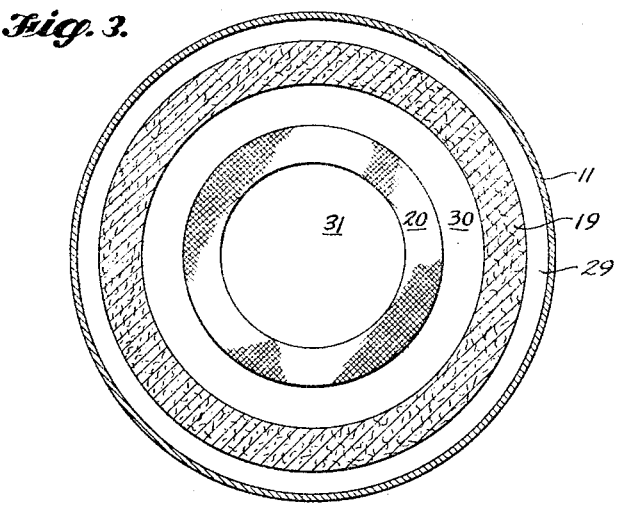
FIG. 3 is a cross-sectional view of the filter assembly taken on lines 3—3 of FIG. 2.

The two-stage filter assembly 8 as shown in detail in FIGS. 2 and 3 comprises a housing having a head portion 10 and bowl portion 11 operatively connected by a ring 12 which is internally threaded to cooperate with external threads on head 10 and includes a flange 13 which engages a flange 14 of bowl 11. An oil seal such as O-ring 15 is provided between head 10 and bowl 11 to prevent leakage from the assembly.

Housing head 10 is provided with an inlet 16 and an outlet 17 which interconnect with conduit means 7 and 9, respectively. Inlet 16 leads to an internal passage 18, said passage 18 being so designed as to allow a predetermined volume of fluid to flow from inlet 16 to bowl 11 and thus may take on any configuration necessary to establish the desired flow rate; for example, passage 18 may be kidney shaped or be annular.

Concentrically disposed in bowl 11 is a primary filter 19 and a secondary filter 20. The primary filter 19 is of the disposable type and made of a preferred filter material such as epoxy resin impregnated cellulose paper and may have a corrugated form to provide a greater surface area. The filter material is supported and protected by perforated material such as sheet metal as well known in the art. Primary filter 19 is designed to have at most 5 micron absolute particle removal rate and for hydraulic flows up to 15 gallons per minute (g.p.m.). Therefore, it is considered as a fine filter element.

The secondary filter 20 is of the cleanable type and made of preferred material such as sintered wire mesh with a surface of sinter-bonded fine metal powder and it also may be corrugated to provide a larger surface area. As in the primary filter, the secondary filter material is supported by perforated material such as stainless steel or aluminum. Secondary filter 20 is designed to have at most a 15 micron absolute particle removal rate and for hydraulic flows up to 48 gallons per minute (g.p.m.) for short durations. Therefore, it is considered as a coarse filter element with respect to primary filter 19.

Head 10 of the housing is designed to receive the upper ends of filters 19 and 20 which are held in place at their lower end by end cap 21 and spring 22 when bowl 11 is attached to head 10 by ring 12. End cap 21 includes a pair of annular flange portions 23 and 24 within which filters 19 and 20 are respectively retained. As shown in FIG. 2, end cap 21 also includes a central cupped portion and a groove in flange 24 within which spring 22 is retained.

To prevent leakage around primary filter 19 an O-ring 25 is positioned around the upper end of the filter to cooperate with head 10 and another O-ring 26 is positioned in flange 23 of end cap 21 to cooperate with the lower end of filter 19. Similarly, leakage around secondary filter 20 is prevented by an O-ring 27 positioned around the upper end of the filter to cooperate with head 10 and O-ring 28 is positioned in flange 24 of end cap 21 to cooperate with the lower end of filter 20.

With filters 19 and 20 in place, an annular space 29 is defined between the interior wall of bowl 11 and the exterior surface of primary filter 19, said space 29 receiving fluid from inlet 16 through passage 18. A space 30 is defined between the interior surface of filter 19 and the exterior surface of secondary filter 20. The interior surface of filter 20 defines a space 31 which is connected with outlet 17 through passage 32, said passage 32 having an enlarged lower portion of substantially the same diameter as the interior space 31 of secondary filter 20.

A passage 33 in head 10 interconnects space 29 with a chamber 34 in head 10, chamber 34 being so constructed as to define a valve seat upon which a by-pass valve element 35 is normally held in the closed position by a spring 36. The function of the by-pass valve will be described hereinafter. Chamber 34 is connected with space 30 through passage 37.

A pair of pressure sensitive indicators 38 and 39, the purpose of which will be described hereinafter, are positioned in head 10 of the housing. Indicator 38 is operatively connected with passage 33 through passage 40 and indicator 39 is operatively connected with chamber 34 through passage 41.

A passage 42 in head 10 interconnects space 30 with a chamber 43 in head 10, chamber 43 being so constructed as to define a valve seat upon which a by-pass valve element 44 is normally held in the closed position by a spring 45, the function of which is described hereinafter. Chamber 43 is connected with passage 32 which leads to outlet 17 through a passage 46.

In operation, fluid is supplied by pumps 1 to actuators 4, and the return fluid from each actuator passes through filter assembly 8 to reservoir 2 which is connected to the inlet of pumps 1. During normal operation the flow rate of the fluid through return conduit means 7 and 9 is in the range between 5 to 7 gallons per minute (g.p.m.) and the fluid flows through inlet 16, passage 18, space 29, primary (fine) filter 19, space 30, secondary (coarse) filter 20, space 31, passage 32 and outlet 17. Under certain operating conditions such as actuation of the landing gear, wing flaps, etc., flow surges occur which are considerably above the 5 to 7 g.p.m. flow rate. When such surges occur, by-pass valve element 35 is moved against the tension of spring 36 and the pressure in space 30 acting against the back side of element 35, to allow a portion of the fluid entering inlet 16 to pass through passage 33, chamber 34, passage 37, space 30, secondary filter 20, space 31, passage 32 to outlet 17, thereby by-passing primary filter 19. Since these surge conditions are of short duration, any very small particles which are not entrapped by the coarse secondary filter 20 will be eventually entrapped by the fine primary filter 19 as the fluid continues to circulate through the system during the normal low flow condition.

While by-pass valve element 35 has been illustrated as a spring biased pressure-sensitive valve, other types of flow control valves for by-passing fluid around primary filter 19 may be utilized because the pressure of the fluid within the housing is related to the pressure of the fluid entering inlet 16, the construction of inlet passage 18, and the rate of flow through primary filter 19.

As the fine primary filter 19 entraps particles, the surface area through which the fluid passes is decreased, thus changing the fluid flow conditions through filter assembly 8 and correspondingly increasing the fluid pressure in inlet 16, passage 18 and space 29. When such change in fluid flow conditions reaches a predetermined amount, valve element 35 is moved off its seat and a portion of all of the fluid (depending on the contamination of filter 19) is by-passed through passage 33, chamber 34, passage 37, space 30 to secondary filter 20.

Indicator 38 is pressure sensitive and is actuated when a predetermined pressure in space 29 or a predetermined pressure differential across primary filter 19 is reached, thus indicating that filter 19 is clogged and in need of servicing. To prevent premature actuation of indicator 38 by the short duration pressure surge mentioned above, the passage 40 interconnecting indicator 38 with passage 33 is smaller in diameter than passage 33, and thus acts as a restriction which tends to smooth out the pressure surges. Thus, whenever pressure sensitive indicator 38—which may actuate a light, sound mechanism, etc.—is operating, the operator is warned that the primary filter 19 has reached a predetermined clogged condition and that fluid may be bypassing the fine primary filter 19 and that due to the larger particle removal ability of the coarse secondary filter 20 any fine particles that may be in the fluid bypassing primary filter 19 are being carried to or through the other components of the system, thus greatly increasing the possibility of system failure.

Until the clogged primary filter 19 is serviced, substantially all the fluid will be directed through the coarse secondary filter 20, which continues to entrap the relatively larger particles in the fluid. As the filtration area of secondary filter 20 is decreased it causes a gradual increase in pressure in space 30. When such pressure increase reaches a predetermined amount, by-pass valve element 44 is moved off its seat and substantially all of the fluid, depending on the contamination of filter 20, is by-passed from space 30 through passage 42, chamber 43, passage 46, passage 32 to outlet 17, thus providing substantially no filtering of the fluid by the coarse secondary filter 20.

Indicator 39 is pressure sensitive and is actuated when a predetermined pressure in space 30 or a predetermined pressure differential across secondary filter 20 is reached, thus indicating that the coarse filter 20 has reached a predetermined clogged condition and is in need of servicing. Indicator 39 is operatively connected with space 30 through passage 37, chamber 34 and passage 41 which like passage 40, provides a restrictive flow to the indicator to prevent premature actuation thereof. Thus, whenever pressure sensitive indicator 39—which also may actuate a light, sound mechanism, etc.—is operating, the operator is warned that secondary filter 20 is in need of servicing.

By-pass valve element 44 is normally set to be responsive to a higher pressure setting than that set for the actuation of indicator 39. The primary purpose of the secondary filter element by-pass valve is for structural protection of lines and fittings in the system, and in this embodiment it should open that maximum flow rates only after 50 to 80% of the dirt holding capacity of the secondary filter element is exceeded.

While indicators 38 and 39 have been shown as being responsive to pressure in spaces 29 and 30, respectively, these indicators may be responsive to pressure differentials across their respective filters by additionally directing fluid pressure from space 30 to indicator 38 and from space 31 to indicator 39, and utilizing conventional pressure differential mechanism for actuating the indicators.

It has thus been shown that the instant invention provides a novel two-stage fluid filter system wherein the fluid flows first through a fine filter and then through a coarse filter, with valve mechanism responsive to fluid flow conditions within the filter assembly to by-pass in whole or in part the fine and/or the coarse filters, and incorporating mechanism for indicating that either of the filters is in need of servicing.

While the description has been directed to a hydraulic aircraft control system, the filter installation of the invention may be used in any fluid system that requires cleanliness and a tolerance to poor servicing, such as hydraulic test stands or water purification systems.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. A two-stage fluid filter assembly comprising
    a head section with an inlet passage and an outlet passage formed therein,
    a bowl section removably attached to said head section,
    primary filter means removably disposed in said bowl section to define a first annular space between an interior wall of said bowl section and an exterior surface of said primary filter means,
    secondary filter means concentrically positioned within said primary filter means and removably disposed in said bowl section to define a second annular space between an interior surface of said primary filter means and an exterior surface of said secondary filter means,
        said secondary filter means having an internal third space,
    first internal passage means formed in said head section for allowing the passage of fluid from said inlet passage into said first annular space,
    first by-pass valve means positioned in said head section and interconnecting said first annular space with said second annular space,
        said first by-pass valve means being actuated by a predetermined fluid pressure differential across said primary filter means to by-pass fluid flow around said primary filter means,
    second by-pass valve means positioned in said head section and interconnecting said second annular space with said third space,
        said second by-pass valve means being responsive to a greater predetermined fluid pressure differential than said first by-pass valve means to by-pass fluid flow around said secondary filter means,
    second internal passage means formed in said head section for conducting fluid from said third space into said outlet passage, and
    pressure sensitive indicator means positioned in said head section and being operatively connected to said first annular space through a restrictive flow passage means,
        said restrictive flow passage means being adapted to smooth out fluid pressure surge conditions of relatively short durations to prevent inadvertent tripping of said indicator means,
        said indicator means being responsive to a predetermined pressure increase in said first annular space due to contamination clogging of said primary filter means.

2. The combination according to claim 1 including
second pressure sensitive indicator means positioned in said head section and being operatively connected to said second annular space through a second restrictive flow passage means,
    said second restrictive flow passage means being adapted to smooth out fluid pressure surge conditions of relatively short durations to prevent inadvertent tripping of said indicator means,
said second indicator means being responsive to a predetermined pressure increase in said second annular space due to contamination clogging of said secondary filter means.

3. The combination according to claim 1 wherein
said primary filter means includes relatively fine filter material to provide fine filtering action, and
said secondary filter means includes relatively coarse filter materials to provide coarse filtering action.

4. The combination according to claim 3 wherein
said primary and secondary filter means are mounted in separately removable fashion.

References Cited by the Examiner

UNITED STATES PATENTS

| | | | |
|---|---|---|---|
| 2,076,935 | 4/1937 | Burckhalter | 210—132 |
| 2,612,270 | 9/1952 | Lewis et al. | 210—315 X |
| 2,928,499 | 3/1960 | Nallinger | 210—168 X |
| 2,937,756 | 5/1960 | Humbert | 210—130 X |
| 2,998,138 | 8/1961 | Mould et al. | 210—90 |
| 3,000,505 | 9/1961 | Scavuzzo | 210—132 |
| 3,040,894 | 6/1962 | Pall | 210—90 |
| 3,067,880 | 12/1962 | Bowers et al. | 210—444 X |
| 3,120,490 | 2/1964 | Samson | 210—132 |
| 3,150,633 | 9/1964 | Holl | 210—90 X |

REUBEN FRIEDMAN, *Primary Examiner.*

F. A. SPEAR, *Assistant Examiner.*